United States Patent Office 3,088,964
Patented May 7, 1963

3,088,964
2-PHENYLPROPYL ORGANOSILOXANES
John W. Ryan, Midland, Mich., assignor to Dow-Corning Corporation, Midland, Mich., a corporation of Michigan
No Drawing. Filed Sept. 29, 1958, Ser. No. 763,817
8 Claims. (Cl. 260—448.2)

The present invention relates to organosiloxanes containing units of the formula $$CH_3CH(C_6H_5)CH_2(R)_xSiO_{\frac{3-x}{2}}$$

in which each R represents a monovalent hydrocarbon radical free of aliphatic unsaturation and $x$ is an integer of from 1 to 2 inclusive, there being no more than one $CH_3CH(C_6H_5)CH_2$— radical per Si atom, and methods for the preparation thereof and of intermediates thereto.

Organosiloxanes containing $$C_6H_5R_xSiO_{\frac{3-x}{2}}$$

units are well known. They are eminently useful materials, but suffer from the disadvantage that all commercially practical methods for the preparation of their precursors (e.g. $C_6H_5R_xSiCl_{3-x}$ type compounds) lead to yields in the region of only 50 to 60 percent. Also there are no acceptable processes which lead directly to the siloxanes without the need for preparing and purifying the intermediate monomeric silanes.

It is an object of this invention to circumvent the above difficulties. A further object is to provide novel organosiloxanes with outstanding low temperature properties.

It has been found that α-methylstyrene can be made to react with either monomeric silanes or polymeric organosiloxanes containing silicon-bonded hydrogen atoms to produce 2-phenylpropyl substituted compounds in yields of 90 to 95% or more, and that the compounds so produced have the sought-for low temperature properties.

The defined $$CH_3CH(C_6H_5)CH_2(R)_xSiO_{\frac{3-x}{2}}$$

units can be present in linear or cyclic homopolymers or in linear, cyclic, or cross-linked copolymers. The linear polymers can contain the defined units in which $x$ is 1, and can be end-blocked with the same type of unit in which $x$ is 2, or with silicon-bonded OH groups, or with $R'_{3-n}H_nSiO_{.5}$ units in which $n$ is 0 or 1, and each R' is an aryl, alkyl, alkylene, haloaryl, or haloalkyl radical. The linear polymers can also contain, if desired, units of the formula $R'_{2-n}H_nSiO$. Linear disiloxanes which have the formula $[CH_3CH(C_6H_5)CH_2(R)_2Si]_2O$ are also within the scope of this invention.

The cyclic homopolymers herein can be cyclic trimers, tetramers, pentamers, hexamers, or larger. The structural formula for the trimer, as an example, can be illustrated as

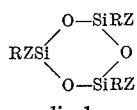

where Z represents the radical

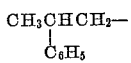

For simplicity, such structures are represented hereafter as having the formula $[CH_3CH(C_6H_5)CH_2(R)SiO]_y$, as is conventional usage in the organosiloxane art. The subscript $y$, of course, has a value corresponding to the number of units in the cyclic, i.e. a value of 3 for the trimer, 4 for the tetramer, etc. The cyclic copolymers of this invention have a structure comparable to that above, except that one or more, but not all, of the siloxane units have the formula $R'_{2-n}H_nSiO$ where R' and $n$ are as above defined. The cross-linked copolymers herein contain any of the above-defined units in any combination along with $R'_{1-n}H_nSiO_{1.5}$ and/or $SiO_2$ units.

Small amounts of uncondensed silicon-bonded OH groups or unhydrolyzed silicon-bonded halogen or alkoxy groups can be present in the defined polymers or copolymers, as is conventional in organosiloxanes. Thus, it will be seen that the copolymers of this invention can best be defined as consisting essentially of (1) polymeric units of the formula $$CH_3CH(C_6H_5)CH_2(R)_xSiO_{\frac{3-x}{2}}$$

wherein R is a monovalent hydrocarbon radical free of aliphatic unsaturation and $x$ is an integer of from 1 to 2 inclusive, there being no more than one $$CH_3CH(C_6H_5)CH_2-$$

radical per Si atom, and (2) polymeric units of the formula $$R'_mH_nSiO_{\frac{4-m-n}{2}}$$

wherein each R' is selected from the group consisting of aryl, alkyl, alkenyl, haloaryl, and haloalkyl radicals, $m$ is an integer of from 0 to 3 inclusive, and $n$ is an integer of from 0 to 1 inclusive. Preferably the sum of $m+n$ in the copolymer has an average value of from 0.8 to 3 inclusive, and it is preferred that there be at least 0.1 mol percent of the (1) units present in the copolymer.

The polymers of this invention can be prepared by hydrolyzing one or more silanes of the formula $[CH_3CH(C_6H_5)CH_2]R_xSiCl_{3-x}$. The latter are best prepared by reacting α-methylstyrene with $R_xHSiCl_{3-x}$ in the presence of chloroplatinic acid as a catalyst. Copolymers can be prepared by cohydrolyzing one or more of the aforesaid silanes with one or more silanes of the formula $R'_mH_nSiCl_{4-m-n}$ or their alkoxy substituted derivatives. Conventional organosilane hydrolysis techniques can be used. When cyclic compounds are desired, it is preferred to "crack" the hydrolyzate under reduced pressure by heating it in contact with an organosiloxane cracking catalyst such as NaOH, KOH, or a Na or K salt of an organosilanol.

An alternative method for the preparation of the organosiloxanes of this invention is in the reaction of α-methylstyrene directly with an organosiloxane containing silicon-bonded H atoms. This reaction is also best carried out in the presence of chloroplatinic acid as the catalyst, and it too is an addition reaction which results in the attachment of 2-phenylpropyl groups to those silicon atoms having hydrogen attached thereto.

The relative amounts of reactants in either the first or second type of addition reaction are not critical, but ordinarily an amount of α-methylstyrene will be used which will provide at least one double bond for each SiH present. The catalyst is generally used in an amount to provide from $1 \times 10^{-3}$ to $1 \times 10^{-6}$ mol Pt per mol of the α-methylstyrene, although larger amounts do no harm. The reaction may occur slowly at room temperature in some cases, but for practical rates the reaction is ordinarily carried out at from 75° to 150° C.

This addition reaction of α-methylstyrene is rather unique in that it produces only the 2-phenylpropyl substituted compounds. This is in contrast to the reaction of styrene, which produces both

and $C_6H_5CH_2CH_2Si\equiv$ type compounds. The latter is undesirable, for contact with alkaline materials cleaves the organic group from the silicon, giving ethyl benzene and leading to undesired cross-linking in the organosiloxane product.

The R radicals in the compounds claimed herein can be any monovalent hydrocarbon radicals free of aliphatic unsaturation, other than the 2-phenylpropyl radical itself, and can be the same or different radicals. Suitable R radicals include alkyl radicals such as methyl, ethyl, and octadecyl; aryl radicals such as phenyl, xenyl, and naphthyl; aralkyl radicals such as benzyl; alkaryl radicals such as tolyl and xylyl; and cycloaliphatic radicals such as cyclohexyl.

When any particular $R_xHSiCl_{3-x}$ compound for the addition reaction is not readily available, α-methylstyrene can be retracted with $HSiCl_3$ and then the adduct Grignardized with the appropriate RMgCl or RMgBr compound.

Suitable R' radicals include any of the alkyl or aryl radicals illustrated above, and alkenyl radicals such as vinyl, allyl, hexenyl, and cyclohexenyl; haloaryl radicals such as bromophenyl, dichlorophenyl, and pentachloroxenyl; and the haloalkyl radicals such as perchloroethyl and 1,1,1-trifluoropropyl radicals. The most preferred R radical is the methyl radical, the most preferred R' radicals are methyl, ethyl, phenyl, and vinyl.

Organosiloxane rubbers can be prepared from any of the polymers or copolymers of this invention which have a ratio of total organic groups to silicon ranging between about 1.95 and 2.05. Conventional fillers, cure accelerators (also known as vulcanizing agents) and curing or vulcanization techniques for the well-known "silicone rubbers" can be employed here.

Suitable fillers include $TiO_2$, $Fe_2O_3$, talc, alumina, carbon black, clay, zinc oxide, whiting $CaCO_3$, glass fibers, asbestos fibers, mica, and silica. The latter is the most preferred, and it can be used in any of the many finely divided forms which are available, e.g., silica aerogels and xerogels, natural forms such as diatomaceous earth, and fume silica. Preferably a reinforcing silica is employed, i.e., a silica of relatively small particle size such as those described by Warrick in U.S. Patent No. 2,541,137, issued February 13, 1951. The amount of filler employed will vary greatly with the type of filler used. Ordinarily the amount will range from 10 to 90% by weight based on the weight of the organosiloxane. Where reinforcing silica fillers are used, 20 to 40% is the usual range.

A host of cure accelerators or vulcanizing agents are known to be suitable for organosiloxane rubber preparation, and these are all suitable here. Examples are given in U.S. Patent 2,541,137 mentioned above, and in U.S. Patents 2,448,530; 2,453,562; 2,460,795; 2,480,620; 2,521,528; 2,558,561; and 2,613,199. Most preferred are the organic "per" compounds, such as benzoyl peroxide, bis(dichlorobenzoyl)peroxide, t-butylperbenzoate, and t-butylperacetate. Other well-known free-radical generators are also particularly suitable, for example, the aliphatic azo compounds such as 2-azo-bis-isobutyronitrile. The catalysts are generally used in amounts of from about 0.1 to 5% by weight, based on the weight of the organosiloxane.

Ordinarily, vulcanization is achieved by heating the compounded stock, containing the organosiloxane, filler, and catalyst, at 100 to 200° C. Rubbers can also be prepared without using heat or a catalyst by exposing the organosiloxane-filler mixture to ionizing radiation such as that from X-rays, radioactive elements, or particle accelerators such as a cyclotron or Van de Graaff generator. The latter techniques are well known.

The preferred rubbers of this invention can be defined as those obtained from the process comprising vulcanizing a mixture consisting essentially of (1) a copolymeric organosiloxane consisting essentially of from 85 to 99 inclusive mol percent units of the formula $(CH_3)_2SiO$, from 1 to 15 inclusive mol percent units of the formula $CH_3CH(C_6H_5)CH_2(CH_3)SiO$, and from 0 to 5 inclusive mol percent units of the formula $$CH_3(C_6H_5)_c(CH_2\!\!=\!\!CH)_{1-c}SiO$$

where $c$ is an integer from 0 to 1 inclusive, and (2) an organosiloxane rubber filler.

It is to be understood that the usual additives optionally employed in organosiloxane rubbers can be used here. Thus the various pigments, stabilizing agents such as metal salts of carboxylic acids, compression set additives such as mercurous oxide, and blowing agents for foamed rubber products can be used if desired.

The fluid products of this invention are useful as hydraulic fluids and lubricating oils, and they exhibit better lubricating properties than dimethylsiloxanes. Those products with appropriate boiling points can be used as diffusion pump fluids. The cyclic products can be polymerized to high molecular weight gums by the use of conventional organosiloxane polymerization agents, and the gums can be converted to rubber as above described. The rubber is useful as thermal and electrical insulation, gasketing, and the like, and maintains its flexibility at very low temperatures. The products which are resinous in nature can be used, in the well-known manner of conventional organosiloxane resins, as electrical insulating varnishes, protective coatings, and laminating or molding compounds. The compatibility of the fluids described herein toward alcohols suggests their use in cosmetic formulations such as skin ointments, sun tan lotions, and the like.

The following examples are illustrative only. The symbols Me, Et, Ph, and Vi have been used, where expedient, to represent methyl, ethyl, phenyl, and vinyl radicals respectively. All parts given are parts by weight.

*Example 1*

A mixture of 354 g. α-methylstyrene and sufficient 0.06 M chloroplatinic acid solution in dioxane to provide $2\times10^{-5}$ mol of Pt was heated to about 90° C. and 380 g. $MeHSiCl_2$ were slowly added thereto. The mixture was heated to 140° C. overnight and distilled to yield the compound $CH_3CH(C_6H_5)CH_2(CH_3)SiCl_2$, B.P. 148 to 149° C. at 42 mm. Hg. A solution of 330 g. of the latter compound in about an equal amount of benzene was hydrolyzed by adding it to an excess of water. The resulting hydrolyzate was washed to neutrality with a dilute aqueous solution of sodium bicarbonate. The hydrolyzate, which contained a mixture of polymers of the unit formula $CH_3CH(C_6H_5)CH_2(CH_3)SiO$, was then mixed with about 0.2 g. KOH, the benzene was removed by flash distillation, and the mixture further heated under reduced pressure to distill out a mixture of cyclic compounds of the formula $[CH_3CH(C_6H_5)CH_2(CH_3)SiO]_y$ where $y$ was 3 and 4. The viscosity of this mixture was 216 cs. at 25° C. and it was obtained at a yield representing 95% of the theoretical yield.

*Example 2*

A mixture of 118 g. of α-methylstyrene and $1.9\times10^{-5}$ mole of chloroplatinic acid in dioxane was heated to 110° C. and 60 g. of the cyclic siloxane $(MeHSiO)_5$ were added thereto. The mixture was held at 110° C. overnight, then about 0.2 g. KOH added thereto. The product removed by strip distillation at 1 mm. Hg had a viscosity of 216 cs. at 25° C. and represented a yield of 92%. This strip distillate was fractionated to yield several fractions which were geometrical isomers of the cyclic trimer $[CH_3CH(C_6H_5)CH_2(CH_3)SiO]_3$, boiling range 219–229° C. at 1 mm. Hg, $n_D^{25}$ from 1.5219 to 1.5221, $d_4^{25}$ 1.041. Each fraction was a liquid material, the viscosities varying from 84.5 to 92.9 cs. at 25° C. Geometrical isomers of the cyclic tetramer corresponding to the above trimer were also obtained, boiling range 271 to 276° C. at 1 mm. Hg, $n_D^{25}$ 1.5260 to 1.5262, $d_4^{25}$ 1.051.

The viscosities of the various fractions of this cyclic tetramer ranged from 198 to 210 cs. at 25° C. The residue from this distillation contained a minor amount of higher cyclics and linear polymers consisting of units of the formula $CH_3CH(C_6H_5)CH_2(CH_3)SiO$.

*Example 3*

A mixture of 1040 g. α-methylstyrene and $9\times10^{-5}$ mol chloroplatinic acid in dioxane was heated to 110° C. and 481 g. of the cyclic siloxane $(MeHSiO)_4$ was added thereto over a 2-hour period. The reaction mixture was heated at 80 to 120° C. overnight and then distilled directly, without the addition of any cracking catalyst, to give a 95% yield of the cyclic tetramer defined in Example 2.

*Example 4*

A mixture of 591 g. α-methylstyrene and 1 ml. of 0.06 M chloroplatinic acid solution in dioxane was heated to 110° C. and 336 g. of the disiloxane $(Me_2HSi)_2O$ were added in 50 ml. portions. The mixture was heated at 110° C. overnight and the reaction mass was distilled to yield a small quantity of the compound $$Me_2HSiOSi(CH_3)_2CH_2CH(C_6H_5)CH_3$$

B.P. 120° C. at 11 mm. Hg, $n_D^{25}$ 1.4660, $d_4^{25}$ 0.8978, $R_D$ 0.3085 (calculated value 0.3088). The major portion of the distillate represented an 81% yield of the compound $[CH_3CH(C_6H_5)CH_2(CH_3)_2Si]_2O$, B.P. 162° C. at 1 mm. Hg, $n_D^{25}$ 1.5043, $d_4^{25}$ 0.9487, $R_D$ 0.3123 (calculated value 0.3124).

*Example 5*

A mixture of 222 g. $(Me_2SiO)_4$, 57 g. of mixed cyclic trimer and tetramer of the unit formula $$CH_3CH(C_6H_5)CH_2(CH_3)SiO$$

from Example 1, 54.6 $(Me_3Si)_2O$ and a trace of a dimethylsiloxane potassium salt having the average formula $KO(Me_2SiO)_2K$ was heated at 150° C. for 3 hours, and then neutralized with $CO_2$. The reaction mass was devolatilized at 1 mm. Hg, under a heat lamp, effecting the removal of 97 g. of volatile material. The residue was a copolymeric organosiloxane having a viscosity of 2510 cs. at 25° C., and containing $Me_2SiO$ units, $Me_3SiO_{.5}$ units, and $CH_3CH(C_6H_5)CH_2(CH_3)SiO$ units, $n_D^{25}$ 1.4332, $d_4^{25}$ 0.986.

*Example 6*

When $PhHSiCl_2$ or $EtHSiCl_2$ is substituted for the $MeHSiCl_2$ in the addition reaction of Example 1, the corresponding adducts of the formula $$CH_3CH(C_6H_5)CH_2RSiCl_2$$

are formed, where R is Ph or Et respectively. By hydrolyzing these adducts as in Example 1, the corresponding cyclics and polymers of the formula $$[CH_3CH(C_6H_5)CH_2RSiO]$$

are obtained. Likewise, when $(MePhHSi)_2O$ is substituted for $(Me_2HSi)_2O$ in the process of Example 4, the product $[CH_3CH(C_6H_5)CH_2MePhSi]_2O$ is obtained.

*Example 7*

When an equimolar mixture of the cyclics $(Me_2SiO)_4$ and $[CH_3CH(C_6H_5)CH_2MeSiO]_4$ is dissolved in toluene to provide a solution containing about 30% by weight total organosiloxanes, then 50% aqueous KOH added in a ratio of 1 K:1000 Si, and the mixture refluxed for 16 hours while azeotropically removing the water, when the toluene is distilled off the product is a mixture of cyclic trimers, tetramers, pentamers, and higher cyclics corresponding to the general formulas $[(Me_2SiO)_2(ZMeSiO)]$, $[(Me_2SiO)(ZMeSiO)_2]$, $[(Me_2SiO)_2(ZMeSiO)_2]$
$[(Me_2SiO)(ZMeSiO)_3]$, $[(Me_2SiO)_3(ZMeSiO)]$ etc., where Z is the 2-phenylpropyl radical. This mixture of cyclic compounds is relatively soluble in organic alcohols such as methanol, ethanol, and isopropanol even when the alcohols contain considerable quantities of water.

*Example 8*

When a mixture of 2 mols of $(Me_3Si)_2O$ and 1 mol of the cyclic $[CH_3CH(C_6H_5)CH_2MeSiO]_4$ is heated under pressure at 150° C. in the presence of sufficient KOH to provide 1 K per 1000 Si atoms, the reaction product contains compounds of the formula $$Me_3SiO[CH_3CH(C_6H_5)CH_2MeSiO]_zSiMe_3$$

where z is 1, 2, 3, and 4.

*Example 9*

When a mixture of one mol each of $PhSiCl_3$, $MeSiCl_3$, and $CH_3CH(C_6H_5)CH_2MeSiCl_2$ and 0.33 mol $Si(OEt)_4$ is mixed with an equal weight of toluene, hydrolyzed by adding the solution to an excess of water, and the hydrolyzate washed free of acid, there is produced a toluene solution of a resinous copolymer consisting essentially of 10 mol percent $SiO_2$ units and 30 mol percent of each of the units $PhSiO_{1.5}$, $MeSiO_{1.5}$ and $$CH_3CH(C_6H_5)CH_2MeSiO$$

In like manner, by cohydrolyzing an equimolar mixture of $ClC_6H_4SiCl_3$, $F_3CCH_2CH_2SiCl_3$, $MeSiCl_3$, and $$CH_3CH(C_6H_5)CH_2MeSiCl_2$$

there is produced a resinous copolymer containing the corresponding siloxane units.

*Example 10*

A mixture of 24.45 g. $[CH_3CH(C_6H_5)CH_2MeSiO]_4$, 125 g. $(Me_2SiO)_4$, 0.224 g. $(MeViSiO)_4$, and 0.03 g. of a dimethylsiloxane salt having the average formula $$KO(Me_2SiO)_2K$$

was heated at 150° C. for 5 hours to produce a copolymeric gum having a plasticity (as determined on a Williams plastometer) of 0.110 inch. One hundred parts of this gum was milled with 30 parts of fume silica, 1 part of $B(OSiMe_3)_3$ and 0.5 part t-butylperbenzoate. The milled stock was vulcanized by heating it in a mold at 150° C. for 15 minutes. The resulting rubber had a tensile strength of 785 p.s.i. and an elongation at break of 720%. The rubber was flexible at temperatures down to —100° C.

That which is claimed is:

1. An organodisiloxane of the formula $$[CH_3CH(C_6H_5)CH_2(R)_2Si]_2O$$

wherein each R is a monovalent hydrocarbon radical free of aliphatic unsaturation, there being no more than one $CH_3CH(C_6H_5)CH_2$— radical per Si atom.

2. An organodisiloxane of the formula $$[CH_3CH(C_6H_5)CH_2(CH_3)_2Si]_2O$$

3. A process for the production of aralkyl substituted organosilicon compounds in improved yields which comprises reacting (1) α-methylstyrene with (2) an organosilicon compound of the formula $R_xHSiCl_{3-x}$ where R represents a monovalent hydrocarbon radical free of aliphatic unsaturation and x is an integer of from 1 to 2 inclusive, by contacting (1) and (2) in the liquid phase in the presence of a catalytic quantity of chloroplatinic acid.

4. A process for the production of aralkyl substituted organosilicon compounds in improved yields which comprises reacting (1) α-methylstyrene with (2) an organosilicon compound of the formula $(CH_3)_xHSiCl_{3-x}$ where x is an integer of from 1 to 2 inclusive, by contacting (1) and (2) in the liquid phase at a temperature of from 75° to 150° C. in the presence of at least $1\times10^{-6}$ mol chloroplatinic acid per mol of the α-methylstyrene.

5. A process in accordance with claim 4 in which the organosilicon compound is the compound $CH_3HSiCl_2$.

6. A process for the production of aralkyl substituted organosiloxanes in improved yields which comprises reacting (1) α-methylstyrene with (2) an organosilicon compound of the formula $R_xHSiCl_{3-x}$ where R represents a monovalent hydrocarbon radical free of aliphatic unsaturation and $x$ is an integer of from 1 to 2 inclusive, by contacting (1) and (2) in the liquid phase in the presence of a catalytic quantity of chloroplatinic acid, and hydrolyzing the resulting addition product with water.

7. A process for the production of aralkyl substituted organosiloxanes in improved yields which comprises reacting (1) α-methylstyrene with (2) an organosilicon compound of the formula $(CH_3)_xHSiCl_{3-x}$ where $x$ is an integer of from 1 to 2 inclusive, by contacting (1) and (2) in the liquid phase at a temperature of from 75° to 150° C. in the presence of at least $1 \times 10^{-6}$ mole chloroplatinic acid per mol of the α-methylstyrene, and hydrolyzing the resulting addition product with water.

8. A process for the production of aralkyl substituted organosiloxanes in improved yields which comprises reacting (1) α-methylstyrene with (2) an organosiloxane containing units of the formula $CH_3HSiO$, by contacting (1) and (2) in the liquid phase at a temperature of 75° to 150° C. and in the presence of at least $1 \times 10^{-6}$ mol chloroplatinic acid per mole of the α-methylstyrene.

References Cited in the file of this patent

UNITED STATES PATENTS

| | | |
|---|---|---|
| 2,486,162 | Hyde | Oct. 25, 1949 |
| 2,541,137 | Warrick | Feb. 13, 1951 |
| 2,584,544 | Bunnell | Feb. 5, 1952 |
| 2,721,873 | MacKenzie et al. | Oct. 25, 1955 |
| 2,823,218 | Speier et al. | Feb. 11, 1958 |
| 2,843,555 | Berridge | July 15, 1958 |
| 2,954,390 | Pike et al. | Sept. 27, 1960 |

FOREIGN PATENTS

| | | |
|---|---|---|
| 766,528 | Great Britain | Jan. 23, 1957 |